United States Patent
Ayyavu et al.

(10) Patent No.: US 7,028,199 B2
(45) Date of Patent: Apr. 11, 2006

(54) METHOD AND APPARATUS OF AUTOMATIC POWER MANAGEMENT CONTROL FOR SERIAL ATA INTERFACE

(75) Inventors: Vetrivel Ayyavu, Norcross, GA (US); Brian Day, Colorado Springs, CO (US); Ganesan Viswanathan, Duluth, GA (US)

(73) Assignee: LSI Logic Corporation, Milpitas, CA (US)

( * ) Notice: Subject to any disclaimer, the term of this patent is extended or adjusted under 35 U.S.C. 154(b) by 117 days.

(21) Appl. No.: 10/606,138

(22) Filed: Jun. 25, 2003

(65) Prior Publication Data

US 2004/0268170 A1    Dec. 30, 2004

(51) Int. Cl.
G06F 1/26    (2006.01)
G06F 1/32    (2006.01)

(52) U.S. Cl. .................. 713/323; 713/300; 713/320; 713/324

(58) Field of Classification Search .............. 713/300, 713/320, 322, 323, 324
See application file for complete search history.

(56) References Cited

U.S. PATENT DOCUMENTS

| | | | |
|---|---|---|---|
| 5,511,203 A * | 4/1996 | Wisor et al. ............... 713/322 |
| 5,564,015 A | 10/1996 | Bunnell |
| 5,799,199 A | 8/1998 | Ito et al. |
| 5,974,558 A * | 10/1999 | Cortopassi et al. ......... 713/323 |
| 6,000,003 A * | 12/1999 | Allen et al. ................. 713/320 |
| 6,546,496 B1 * | 4/2003 | Wang et al. ................ 713/322 |
| 6,608,729 B1 | 8/2003 | Willems et al. |
| 6,725,385 B1 | 4/2004 | Chu et al. |
| 6,791,942 B1 * | 9/2004 | Jin ............................ 370/229 |
| 2003/0050103 A1 * | 3/2003 | Tourrilhes et al. .......... 455/574 |
| 2004/0148533 A1 | 7/2004 | Nicholas |

\* cited by examiner

Primary Examiner—Lynne H. Browne
Assistant Examiner—James K. Trujillo
(74) Attorney, Agent, or Firm—Suiter West Swantz PC LLO

(57) ABSTRACT

The present invention is directed to a method and apparatus of automatic power management control for Serial ATA interface. In an exemplary aspect of the present invention, an idle or active condition of Serial ATA interface is automatically detected. When Serial ATA is in an idle condition, idle time of Serial ATA interface is counted using a power down counter whose frequency is determined by a programmable register based on input clock. When a power down counter value is equal to a first value, a request for a Partial power state is asserted, and Serial ATA interface is put into a Partial power state. When a power down counter value is equal to a second value, a request for a Slumber power state is asserted, and Serial ATA interface is put into a Slumber power state.

18 Claims, 4 Drawing Sheets

METHOD AND APPARATUS OF AUTOMATIC POWER MANAGEMENT CONTROL FOR SERIAL ATA INTERFACE

FIELD OF THE INVENTION

This invention relates generally to power management control, and particularly to a method and apparatus of automatic power management control for a Serial ATA interface.

BACKGROUND OF THE INVENTION

Serial ATA (Advanced Technology Attachment) is an evolutionary replacement for the Parallel ATA physical storage interface. Serial ATA is a computer bus primarily designed for transfer of data between a computer processor and hard disk and has at least three advantages over Parallel ATA, namely speed, cable management, and Serial ATA's ability of being hot swappable.

There are three interface power states supported in Serial ATA: PhyReady, Partial and Slumber. In PhyReady (or power up) state, the PHY (physical) logic and main PLL (phase-locked loop) are both on and active, and the interface is synchronized and capable of receiving and sending data. Partial and Slumber are two power saving (or power down) modes. In both Partial and Slumber states, the PHY logic is powered, but is in a reduced power state. However, while the exit latency from Partial state is generally no longer than 10 μs (microseconds), the exit latency from Slumber state is generally no longer than 10 ms (milliseconds).

When a Serial ATA interface is idle (i.e., when either a Serial ATA host adapter or a Serial ATA drive is not active) for a period of time, it is desirable to put the interface into a power saving mode. In addition to saving power while in a power saving mode, the interface lifetime may be increased. Preferably, the power state change of the Serial ATA interface is hardware controlled so that communications with high level layers of the interface may be avoided, which may lead to an efficient power saving method when the interface is in idle condition for a programmable period of time.

Thus, it would be desirable to provide a method and apparatus of automatic power management control which automatically puts Serial ATA interface into power up and power down modes.

SUMMARY OF THE INVENTION

Accordingly, the present invention is directed to a method and apparatus of automatic power management control for Serial ATA interface. In an exemplary aspect of the present invention, an idle or active condition of Serial ATA interface is automatically detected. When Serial ATA is in an idle condition, idle time of Serial ATA interface is measured using a power down counter whose frequency is determined by a programmable register based on an input clock. When a power down counter value is equal to a first value, a request for a Partial power state is asserted, and Serial ATA interface is put into a Partial power state. When a power down counter value is equal to a second value, a request for a Slumber power state is asserted, and Serial ATA interface is put into a Slumber power state.

The apparatus of the present invention may put the Serial ATA interface into power up and power down states automatically. Because the present invention automatically detects the interface idle condition and puts the interface into a power saving mode when the interface is in idle condition for a programmable period of time, the present invention may save power and increase the interface lifetime. Moreover, because the present invention controls the power state change of the Serial ATA interface by hardware, communications with high level layers of the interface is avoided, which may lead to an efficient power saving method.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
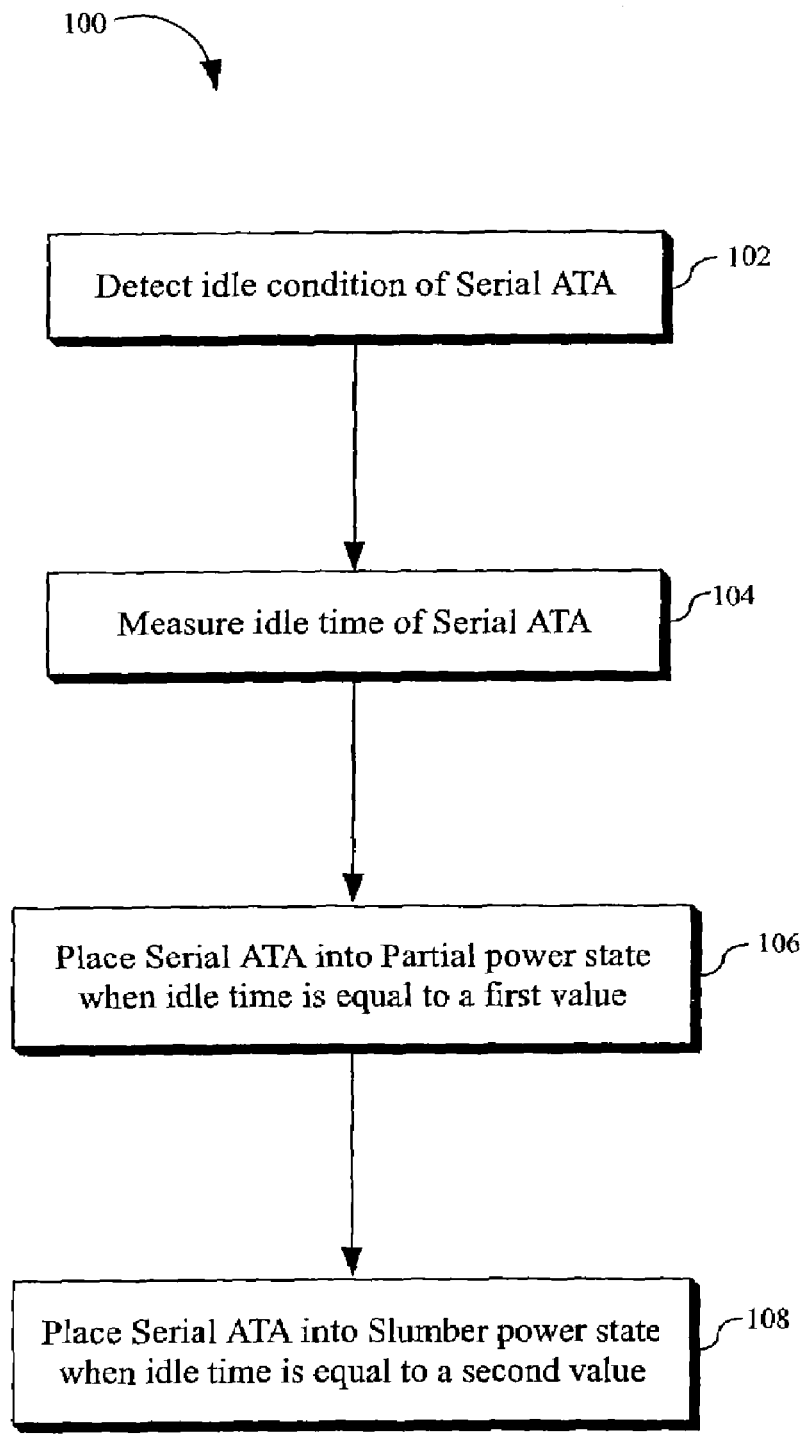
FIG. 1 is a flow diagram showing a method of automatic power management control for the Serial ATA interface in accordance with an exemplary embodiment of the present invention.

Referring first to FIG. 1, a method (or process) 100 of automatic power management control for the Serial ATA interface in accordance with an exemplary embodiment of the present invention is shown. The process starts with step 102, in which an idle condition of a Serial ATA interface is detected. Next, idle time of the Serial ATA interface is measured in step 104. Then in step 106, the Serial ATA interface is placed into Partial power state when the measured idle time is equal to a first value. Next, in step 108, the Serial ATA interface is placed into Slumber power state when the measured idle time is equal to a second value. In a preferred embodiment of the present invention, the second value is always greater than the first value. That way, when both power saving modes are supported and enabled, the present invention ensures that the Serial ATA interface is first placed into Partial State, followed by Slumber. It is understood that other embodiments may be contemplated by a person of ordinary skill in the art without departing from the scope and spirit of the present invention. For example, in an alternative embodiment of the steps 106 and 108, the Serial ATA interface may be placed into a power saving mode when the measured idle time is equal to a predetermined value, wherein the power saving mode is either a Partial power state or a Slumber power state.

Figure 2:
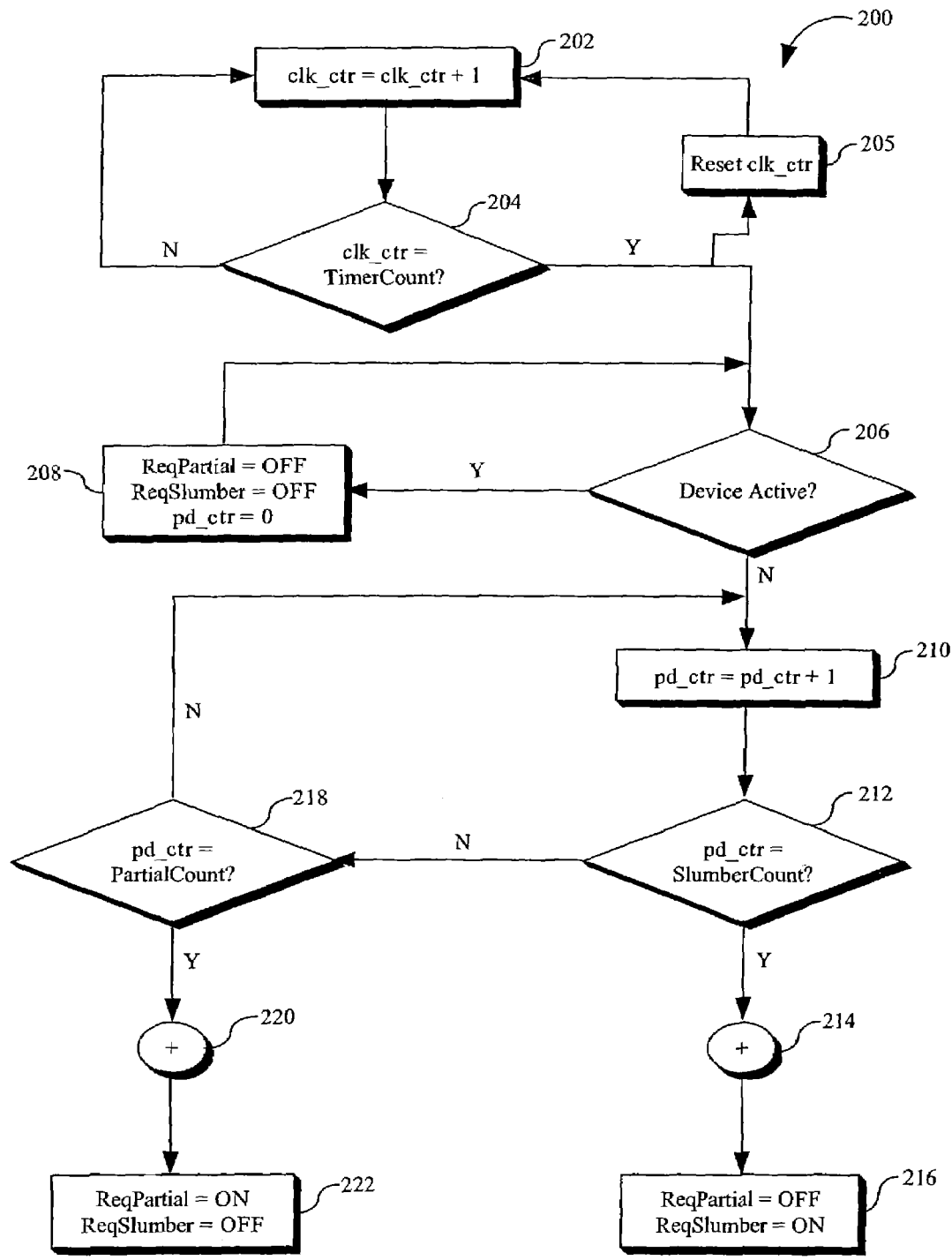
FIG. 2 is a flow diagram showing a method of automatic power management control for the Serial ATA interface in accordance with a further exemplary embodiment of the present invention.

Referring to FIG. 2, a method (or process) 200 of automatic power management control for the Serial ATA interface in accordance with a further exemplary embodiment of the present invention is shown. According to the present invention, there may be three programmable registers: Timer Count Reg, Partial Count Reg, and Slumber Count Reg. Timer Count Reg holds a programmable value TimerCount, which determines the frequency for a power down counter (pd_ctr). For example, based on the frequency of the input clock, Timer Count Reg may be programmed accordingly to obtain the time period such as 1 ms, 2 ms, or the like for the pd_ctr. Partial Count Reg holds a programmable non-zero value PartialCount. When a pd_ctr value is equal to Partial-Count, a request for Partial state (ReqPartial) is asserted. Slumber Count Reg holds a programmable non-zero value SlumberCount. When a pd_ctr value is equal to Slumber-Count, a request for Slumber state (ReqSlumber) is asserted.

According to the process 200, an input clock counter (clk_ctr) counts the clock (step 202) and checks against TimerCount (step 204) to generate the required frequency to operate the pd_ctr. In the step 204, when the clk_ctr value is equal to TimerCount, the process 200 proceeds to steps 205 and 206 simultaneously. In the step 205, the counter clk_ctr is reset, and the process 200 then returns to the step 202.

In the step 206, the interface idle/active condition is automatically detected. According to one aspect of the present invention, the interface is active if any of the following conditions is true: (1) BSY, DRQ, or SERV bit of ATA task file register is ON; (2) COMWAKE or COMRESET OOB (out of band) signal is detected; and (3) firmware is forcing the interface wakeup from a power saving mode by writing a Firmware Forcing WakeUp bit in automatic power management circuitry. If none of the foregoing conditions is true, then the interface is not active (i.e., idle).

When the interface is detected to be active, the process 200 proceeds to step 208, in which any power down requests (ReqPartial and/or ReqSlumber) are de-asserted and the pd_ctr is reset. After the step 208, the process 200 returns to the step 206.

When the interface is detected to be inactive, the process 200 proceeds to step 210, in which the pd_ctr starts to count the interface idle time. Next, in step 212, the pd_ctr value is checked against SlumberCount. If the pd_ctr value is equal to SlumberCount, then in step 214, Slumber Request may be received. Next, in step 216, ReqSlumber is ON (asserted), and ReqPartial is OFF (not asserted). Thus, the interface may be placed into Slumber state.

Following the step 212, if the pd_ctr value is not equal to SlumberCount, then in step 218, the pd_ctr value is checked against PartialCount. If the pd_ctr value is not equal to PartialCount, the process 200 returns to the step 210. If the pd_ctr value is equal to PartialCount, then in step 220, Partial Request may be received. Next, in step 222, ReqPartial is ON (asserted), and ReqSlumber is OFF (not asserted). Thus, the interface may be placed into Partial state.

In a preferred embodiment of the present invention, SlumberCount is always greater than PartialCount. That way, when both power saving modes are supported and enabled, the present invention ensures that ReqPartial is asserted first, followed by a ReqSlumber. It is understood that other embodiments may be contemplated by a person of ordinary skill in the art without departing from the scope and spirit of the present invention.

Figure 3:
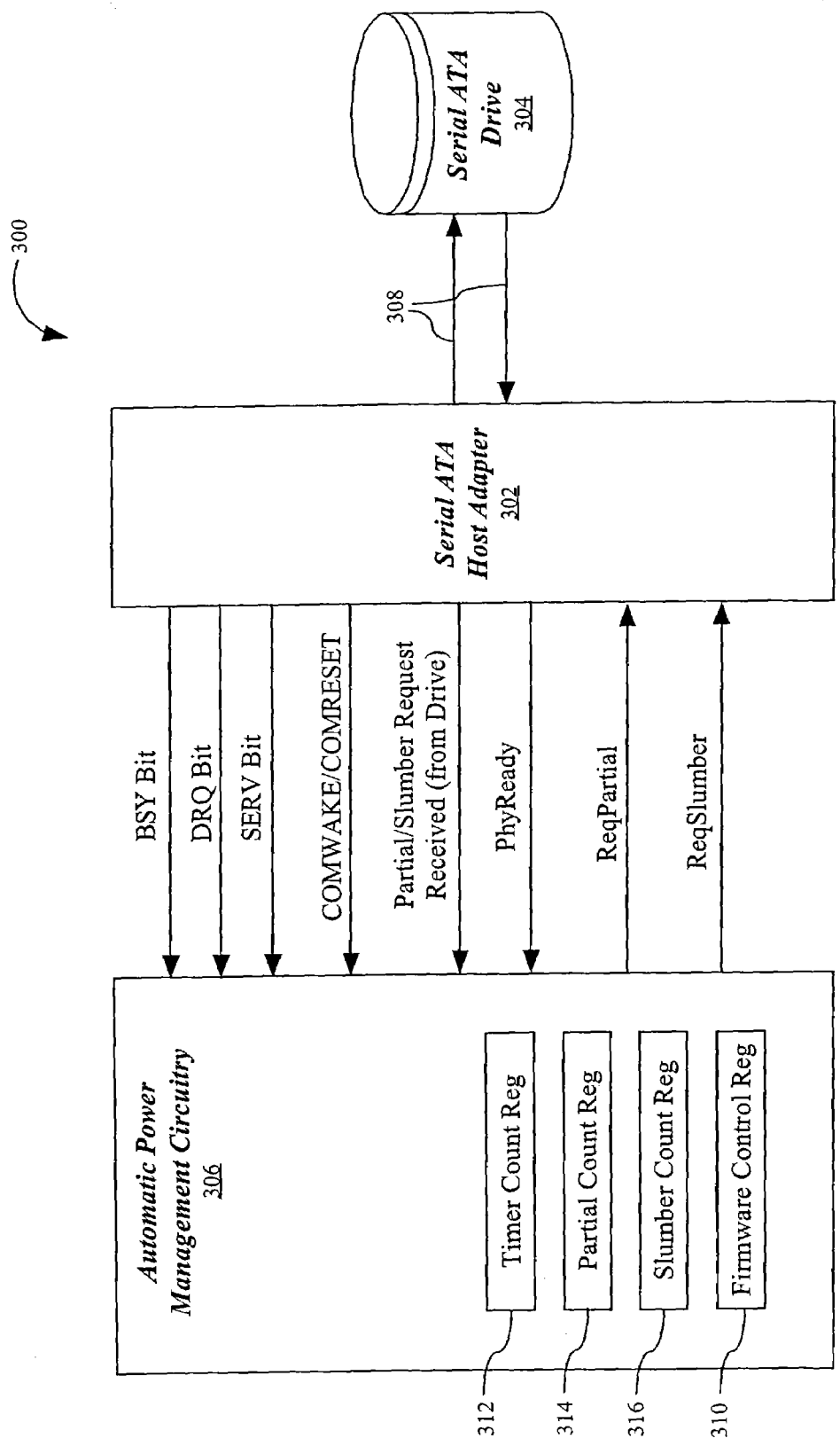
FIG. 3 is a schematic block diagram illustrating an apparatus of automatic power management control for the Serial ATA interface in accordance with an exemplary embodiment of the present invention, including a serial ATA drive, a Serial ATA host adapter, and automatic power management circuitry.

FIG. 3 is a schematic block diagram illustrating an apparatus 300 of automatic power management control for the Serial ATA interface in accordance with an exemplary embodiment of the present invention. The method 100 shown in FIG. 1 and the method 200 shown in FIG. 2 may be implemented in the apparatus 300. The apparatus 300 includes a Serial ATA host adapter 302, a Serial ATA drive 304, and automatic power management circuitry 306. Those of ordinary skill in the art will understand that the Serial ATA host adapter 302 and the Serial ATA drive 304 each have its own physical (PHY), link, transport, and application layers (not shown). The Serial ATA host adapter 302 and the Serial ATA drive 304 are connected through Serial ATA cables 308.

In an exemplary embodiment, the automatic power management circuitry 306 may include a Firmware Control Reg 310 and three programmable registers (Timer Count Reg 312, Partial Count Reg 314, Slumber Count Reg 316). In a preferred embodiment, the Firmware Control Reg 310 is a 32-bit register, whose Bit0 is a Firmware Forcing Slumber bit, Bit1 is a Firmware Forcing Partial bit, and Bit2 is a Firmware Forcing WakeUp bit. The automatic power management circuitry 306 detects the active/idle condition of the Serial ATA host adapter 302 through BSY, DRQ, and SERV Bits and may issue power down requests (ReqPartial and ReqSlumber) to the physical layer of the Serial ATA host adapter 302. The automatic power management circuitry 306 may also issue ReqPartial and/or ReqSlumber to the physical layer of the Serial ATA host adapter 302 when it receives power down requests from the Serial ATA drive 304.

It is understood that FIG. 3 is intended as an example of apparatus of automatic power management control for the Serial ATA interface in accordance with the present invention and not as an architectural limitation to the present invention. Those of ordinary skill in the art will appreciate that various combinations and arrangements may be employed without departing from the scope and spirit of the present invention. For example, the Serial ATA host adapter 302 in FIG. 3 may be connected to more than one Serial ATA drive. In one embodiment, a Serial ATA host adapter may have two ports Port 1 and Port 2, which are connected to Serial ATA drives Drive 1 and Drive 2, respectively. In this case, according to the present invention, for each port there may be independent, identical automatic power management circuitry. If Port 1 of the host adapter and Drive 1 are in idle state, then only Port 1 and Drive 1 may be put into a power saving state, but not Port 2 and Drive 2 (assuming Port 2 and Drive 2 are in active state). In addition, the Timer Count Reg 312, the Partial Count Reg 314, the Slumber Count Reg 316, and the Firmware Control Reg 310 may be physically located outside the automatic power management circuitry 306.

Figure 4:
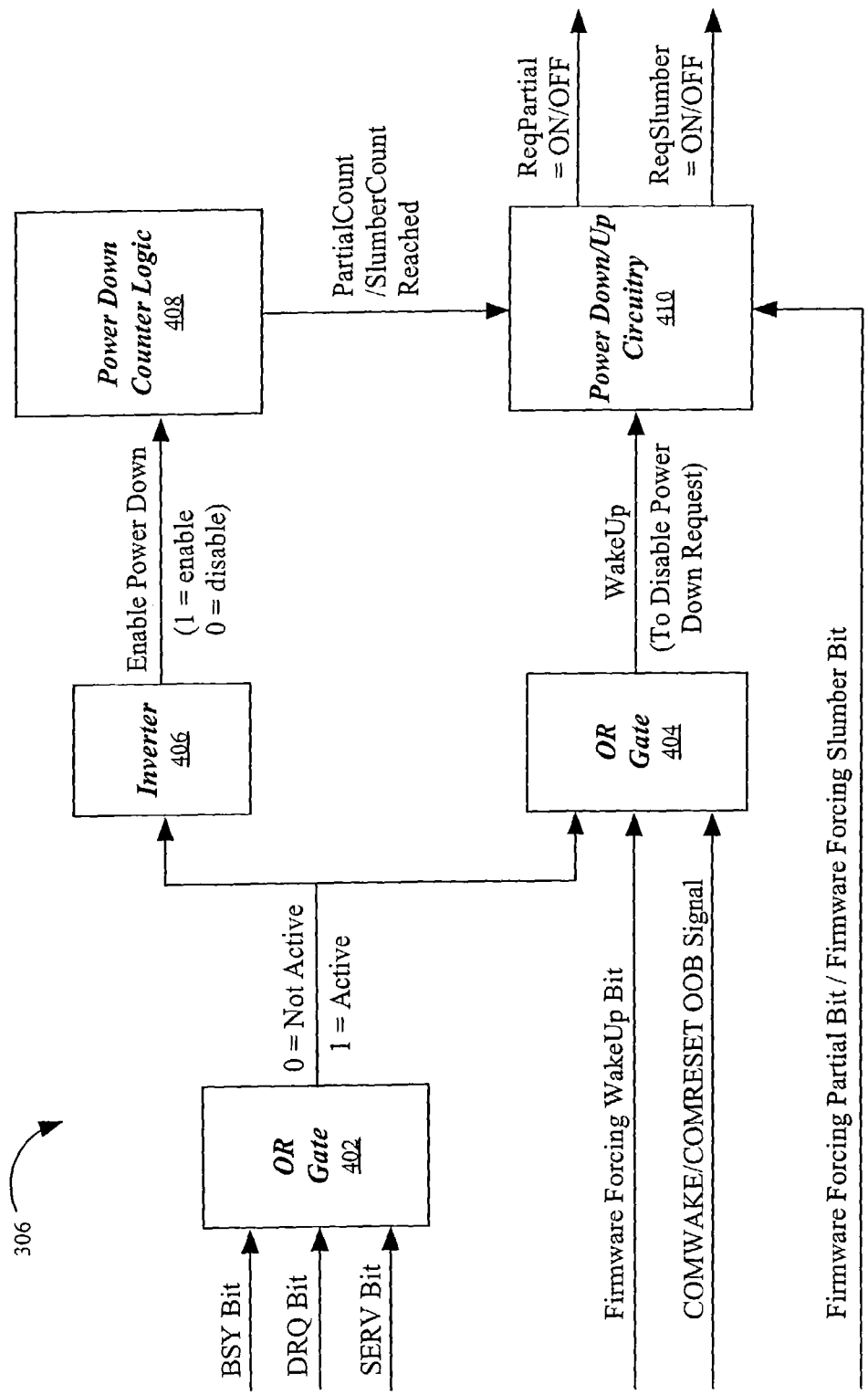
FIG. 4 is a schematic block diagram illustrating an exemplary embodiment of the automatic power management circuitry shown in FIG. 3 in accordance with an exemplary embodiment of the present invention, wherein the Timer Count Reg, the Partial Count Reg, the Slumber Count Reg, and the Firmware Control Reg are not shown.

FIG. 4 is a schematic block diagram illustrating an exemplary embodiment of the automatic power management circuitry 306 shown in FIG. 2 in accordance with an exemplary embodiment of the present invention, wherein the Timer Count Reg, the Partial Count Reg, the Slumber Count Reg, and the Firmware Control Reg are not shown. The method 100 shown in FIG. 1 and the method 200 shown in FIG. 2 may be implemented in the automatic power management circuitry 306. The circuitry 306 may include a first OR gate 402, a second OR gate 404, an inverter 406, power down counter logic 408 (for counting idle time of a Serial ATA host adapter and comparing a power down counter value against PartialCount/SlumberCount), and power down/up circuitry 410 (for issuing a power down or power up request to the Serial ATA host adapter physical layer).

The OR gate 402 receives BSY Bit, DRQ Bit, and SERV Bit as input and outputs a value ("1" or "0", where "1" means a Serial ATA host adapter is active, and "0" means a Serial ATA host adapter is not active) to both the inverter 406 and the OR gate 404 as input. When the OR gate 402 outputs "0", a Serial ATA host adapter is not active, the inverter 406 outputs "1" which enables the power down counter logic 408. When the power down counter value reaches Partial-Count or SlumberCount, the power down/up circuitry 410 issues a power down request to the Serial ATA Physical Layer. Consequently, a power down state of the Serial ATA host adapter may result.

The OR gate 404 receives as input an output from the OR gate 402, a Firmware Forcing WakeUp Bit, and an COM-WAKE or COMREST OOB signal and may output a WakeUp signal to the power down/up circuitry 410, which in turn issues a power up request to the Serial ATA Physical Layer. Consequently, a power up state of the Serial ATA host adapter may result.

In addition, a Firmware Forcing Partial Bit or a Firmware Forcing Slumber Bit may be directly written into the power down/up circuitry 410, which then issues a power down request to the Serial ATA Physical Layer, resulting in a power down state of the Serial ATA host adapter.

The present invention may place the Serial ATA interface into power up and power down states automatically by its own. The apparatus of the present invention may automatically detect the interface idle condition and put the interface into a power saving mode when the interface is in idle condition for a programmable period of time. Thus, the present invention may save power and increase the interface lifetime. Moreover, because the present invention controls the power state change of the Serial ATA interface by hardware, communications with high level layers of the interface is avoided, which may lead to an efficient power saving method.

It is appreciated that the present invention is not limited to Serial ATA interface. The present invention may also apply to a variety of other interfaces as may be contemplated by a person of ordinary skill in the art.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A method of automatic power management control for Serial ATA interface, comprising:
   (a) detecting an idle condition of said Serial ATA interface;
   (b) measuring idle time of said Serial ATA interface with a power down counter when said Serial ATA interface is idle; and
   (c) placing said Serial ATA interface into a first power saving mode when said idle time is equal to a first value,
   wherein an input clock counter counts an input clock and checks against a programmable value to generate a required frequency to operate said power down counter, said programmable value being held by a programmable register.

2. The method of claim 1, wherein said first power saving mode is a Partial power state.

3. The method of claim 1, wherein said first power saving mode is a Slumber power state.

4. The method of claim 1, wherein a frequency of said power down counter is determined by a programmable register based on input clock.

5. The method of claim 1, wherein said step (c) comprising issuing a request for said first power saving mode to a physical layer of said Serial ATA interface by hardware when said idle time is equal to said first value.

6. The method of claim 1, further comprising:
   (d) placing said Serial ATA interface into a second power saving mode when said idle time is equal to a second value, wherein said first power saving mode is a Partial power state, and said second power saving mode is a Slumber power state.

7. The method of claim 6, wherein said second value is greater than said first value.

8. The method of claim 7, wherein said step (d) comprising issuing a request for Slumber power state to a physical layer of said Serial ATA interface by hardware when said idle time is equal to said second value.

9. The method of claim 1, further comprising de-asserting a power down request when said Serial ATA interface is active.

10. An apparatus of automatic power management control for Serial ATA interface, comprising:
    (a) means for detecting an idle condition of said Serial ATA interface;
    (b) means for measuring idle time of said Serial ATA interface with a power down counter when said Serial ATA interface is idle; and
    (c) means for placing said Serial ATA interface into a first power saving mode when said idle time is equal to a first value,
    wherein an input clock counter counts an input clock and checks against a programmable value to generate a required frequency to operate said power down counter, said programmable value being held by a programmable register.

11. The apparatus of claim 10, wherein said first power saving mode is a Partial power state.

12. The apparatus of claim 10, wherein said first power saving mode is a Slumber power state.

13. The method of claim 10, wherein a frequency of said power down counter is determined by a programmable register based on input clock.

14. The apparatus of claim 10, wherein said means (c) comprises means for issuing a request for said first power saving mode to a physical layer of said Serial ATA interface by hardware when said idle time is equal to said first value.

15. The apparatus of claim 10, further comprising:
    (d) means for placing said Serial ATA interface into a second power saving mode when said idle time is equal to a second value, wherein said first power saving mode is a Partial power state, and said second power saving mode is a Slumber power state.

16. The apparatus of claim 15, wherein said second value is greater than said first value.

17. The apparatus of claim 16, wherein said means (d) comprises means for issuing a request for Slumber power state to a physical layer of said Serial ATA interface by hardware when said idle time is equal to said second value.

18. The apparatus of claim 10, further comprising means for de-asserting a power down request when said Serial ATA interface is active.

* * * * *